Figure 1:
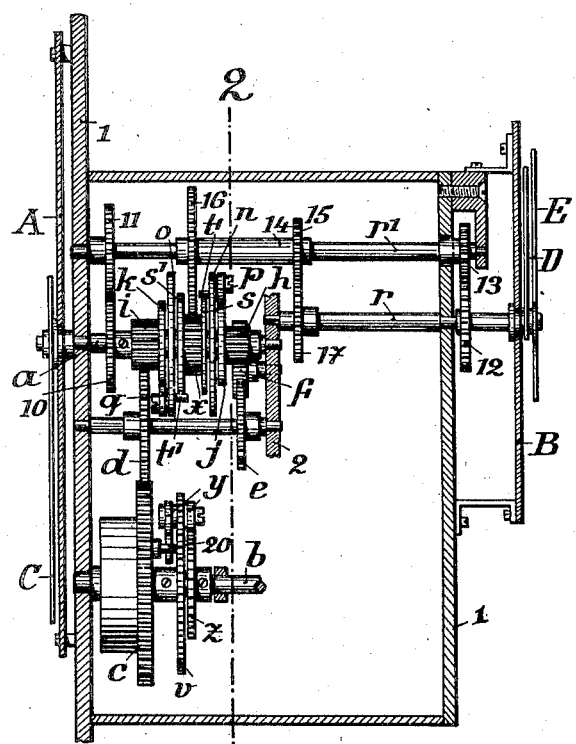

O. BOTHE & O. LÖSCHER.
SPEED INDICATOR FOR MOTOR CARS AND OTHER VEHICLES.
APPLICATION FILED APR. 28, 1909.

996,966.

Patented July 4, 1911.

2 SHEETS—SHEET 1.

WITNESSES

INVENTORS
Otto Bothe
Otto Löscher
ATTORNEYS

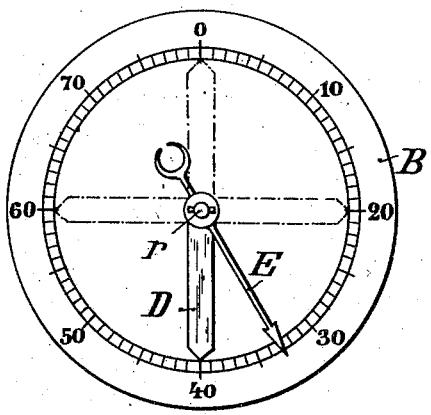
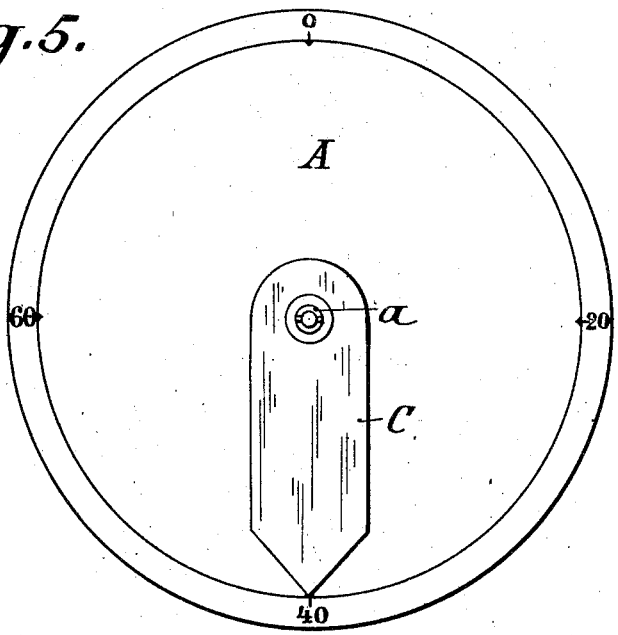

UNITED STATES PATENT OFFICE.

OTTO BOTHE AND OTTO LÖSCHER, OF BERLIN, GERMANY.

SPEED-INDICATOR FOR MOTOR-CARS AND OTHER VEHICLES.

996,966.

Specification of Letters Patent.   Patented July 4, 1911.

Application filed April 28, 1909. Serial No. 492,738.

*To all whom it may concern:*

Be it known that we, OTTO BOTHE, mechanical engineer, a subject of the German Emperor, and resident of 2 Ackerstrasse, Berlin, Germany, and OTTO LÖSCHER, clerk, a subject of the German Emperor, and resident of 20 Ackerstrasse, Berlin, Germany, have invented certain new and useful Improvements in Speed-Indicators for Motor-Cars and other Vehicles; and we do hereby declare the following to be a full, clear, and exact description of the invention, such as will enable others skilled in the art to which it appertains to make and use the same.

The object of the present invention is to provide a speed indicator for motor vehicles, which not only registers the gradual rise and fall of the speed of the vehicles in the usual manner by means of an indicating hand, but also marks by a second hand the speed in a definite number of steps reaching from zero to the highest speed allowed on public roads, the second hand moving in leaps from one step to another and remaining fixed as long as the car does not exceed the speed limits of that step. The hands of the indicator are so arranged and of such size as to be not only visible to the driver or the occupants of the vehicle, but also to persons on the road, and from some distance, so as to enable policemen and others to exercise an efficient control, as to whether the regulations as to speed are duly observed.

The present invention further consists in certain improvements in the mechanism or driving gear of speed indicators.

To produce a leaping movement of the indicating hand, it has been proposed to connect it elastically, for instance by two springs acting in opposite directions, to a continuously adjusted speed measuring gear, and to lock the leaping hand by a device adapted to be released by the continuously adjusted gear, whenever the speed exceeds certain limits in either direction. The leaping hand then moves backward or forward a step under the influence of its elastic connection. This arrangement has however numerous drawbacks. The continuously adjusted measuring gear has to perform the work of moving the leaping hand, and the accuracy of measurement is thereby impaired. Further the leaping hand points true in one direction only, in the other direction it will always point a step too high or too low. The practical use of such an apparatus is therefore very limited.

To avoid the above mentioned drawbacks in the mechanism of the speed indicator according to the present invention, the mechanism moving the leaping hand is not made dependent on the continuously adjusted measuring gear, but is driven by an independent spring both forward and backward. The spring is generally locked by the mechanism itself and is disengaged by the continuously adjusted measuring gear, whenever the speed exceeds certain limits.

Figure 2:
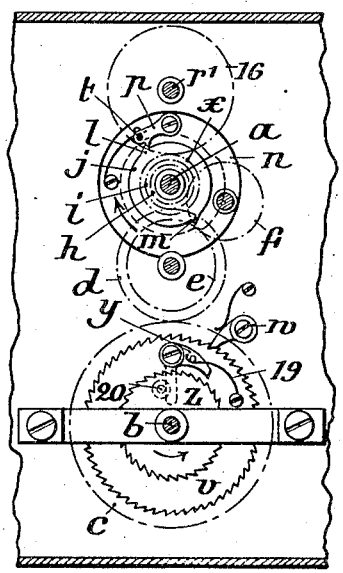
Figure 4:
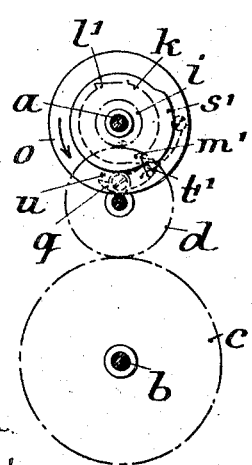
Figure 3:
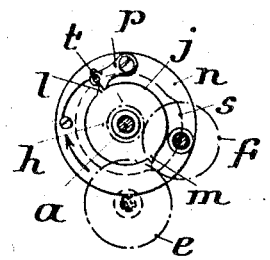

In the accompanying drawings Figure 1 is a vertical section of the mechanism and dials of the indicator. Fig. 2 is a section on line 2—2 of Fig. 1. Figs. 3 and 4 are details of the locking device which show the parts in the position to advance the leaping hand one step. Figs. 5 and 6 are the dials of the indicator.

The drawings represent a form of the present invention by which the speed of the vehicle is indicated in four distinct steps. The mechanism of the indicator is inclosed in a casing and fixed in the wall of the motor vehicle. On the outer wall of the casing a dial A of large size, as shown in Fig. 5, is arranged, over which the leaping hand C moves, whereas on the carward side of the casing a smaller dial B is fixed, over which a smaller leaping hand D and a continuously adjusted indicating hand E move. Both dials are provided with figures on their circumference indicating the speed in miles per hour, or any other desired ratio. By this arrangement the occupants of the car are kept fully aware of the speed of the vehicle, the leaping hand indicating the upper limit of the step in question and the continuously adjusted hand forming an angle with it, the size of which indicates at a glance, whether the vehicle is nearing said limit or not.

Referring to Fig. 1 the outer leaping hand is carried on a shaft $a$. One end of the shaft $a$ is journaled in the outer wall 1 of the casing and its other end in a partition wall 2, and it is rotated one step in either direction whenever the speed of the vehicle exceeds or falls below the upper or lower limit respectively of the step in question. The rotation of the shaft $a$ in both directions is accomplished by means of a single spring inclosed in the casing $c$ which spring is rewound automatically by means of a driving shaft $b$ and a separate mechanism to be described later on. The movement of the spring casing $c$ is transmitted by means of a gear on the casing $c$, and a cogwheel $d$ to a cogwheel $i$ mounted loosely on the shaft $a$. A second cogwheel $e$ is mounted on the same shaft with the cogwheel $d$ and gears with the wheel $f$, which engages the cogwheel $h$ mounted loosely on the shaft $a$. The wheels $h$ and $i$ are therefore rotated in opposite directions by means of the spring casing $c$. Two disks $j$ and $k$ are secured to the wheels $h$ and $i$, said disks being provided with two teeth $l$, $m$ and $l'$, $m'$, placed on opposite sides of said disks. Fixed on the shaft $a$ are two disks $n$ and $o$ carrying pawls $p$ and $q$ placed also on opposite sides of their respective disks. The pawl $p$ normally engages one of the teeth on the disk $j$, while the pawl $q$ normally engages one of the teeth on the disk $k$, and as these disks are rotated by means of the spring casing $c$, this movement is transmitted to the shaft $a$ by means of the pawls $p$, $q$, and disks $n$, $o$. The cogwheels $h$ and $i$ are however rotated in opposite directions by the spring casing $c$ and therefore act in opposite directions on the shaft $a$, which thus remains locked, as long as the pawls engage both the disks $j$, $k$. On the carward side of the partition wall 2 is journaled a shaft $r$, the outer end of which is journaled in the wall 1 of the indicator casing. The shaft $r$ is connected with the speed measuring gear and is continuously adjusted in a known manner according to the speed of the vehicle. The carward end of the shaft $r$ projects through the center of the dial D, and carries the continuously adjusted hand E. Above the shaft $r$ a second shaft $r'$ is arranged, which extends from the outer to the inner wall of the indicator casing. The shaft $r'$ is geared to the shaft $a$ on the one hand by the wheels 10 and 11, and on the other hand by the wheels 12, 13 to a box loosely mounted on the end of the shaft $r$ and carrying the leaping hand D. On the shaft $r'$ a socket 14 is loosely mounted, carrying two cogwheels 15 and 16. The wheel 15 gears with a wheel 17, carried on the shaft $r$ and the wheel 16 gears with a cogwheel $x$ loosely mounted on the shaft $a$, thereby connecting the wheel 16 and the mechanism working the leaping hands to the continuously adjusted shaft $r$. The cogwheel $x$ carries on each side a cam disk $s$ and $s'$. These cam disks are adapted to engage pins $t$ and $t'$ carried on the pawls $p$ and $q$ and extending through slots in the disks $o$ and $n$. When therefore the speed of the vehicle exceeds or falls below the upper or lower limit respectively of a step, the continuously adjusted measuring gear will have rotated the shaft $r$ and wheels 17, 16, 15 and $x$ so far, that one of the pawls $p$ and $q$ is raised by the pin $t$ or $t'$ coming into contact with the corresponding cam $s$ or $s'$ and the shaft $a$ is thereby left free to rotate either backward or forward under influence of the spring casing $c$.

Referring to Figs. 2, 3 and 4, the operation of the parts is as follows. The toothed disk $j$ engaging the pawl $p$, strives to rotate the shaft $a$ to the right, that is in the direction of rising speed. The toothed disk $k$ engaging the pawl $q$ strives to rotate the shaft $a$ in the opposite direction. Shaft $a$ is accordingly locked, and the leaping indicator remains stationary. As soon however as the speed rises above the upper limit of the speed step, the continuously adjusted cam disk $s'$ engages the pin $t'$ on the pawl $q$, raises the pawl and releases the tooth $m'$. The toothed disks $j$, $k$, are now unlocked and are free to rotate in opposite directions. The disk $j$ however still engages the pawl $p$ and the shaft $a$, which is accordingly rotated to the right and causes the leaping indicator to move a step forward. The raised pawl $q$ being fixed to the shaft $a$ follows its movement to the right, whereas the corresponding toothed disk $k$ is rotated in the opposite direction. Both disks being rotated by the spring casing $c$ with equal velocity, the pawl $q$ will come into contact with the second tooth $l'$ of the disk $k$, after having made a quarter of a revolution and thereby again locks the disks and the shaft. It is therefore evident, that the leaping indicator will by this arrangement accomplish a quarter revolution, whenever the speed of the vehicle exceeds the limits of a speed step. In case the speed of the vehicle diminishes and falls below the limit of the step, the same series of movements occurs in the contrary direction. The other pawl $p$ will be raised by the cam disk $s$, and the shaft will be rotated to the left by toothed disk $k$, by means of the pawl $q$, and the indicator will accordingly move backward into the position corresponding to the preceding speed step.

To preclude the possibility of adjusting the indicator by hand to the position corresponding to a lower speed step, a stop $u$ is provided, adapted to engage a projection on the pawl. This stop limits the upward movement of the pawl, so that it can not be raised far enough to allow the cam $s'$ to pass under the pin $t'$.

The spring which rotates the casing $c$ is wound up automatically as already stated. For this purpose the shaft $b$ is provided, to which one end of the spring is attached. The shaft is locked against backward movement, that is against unwinding by a pawl $w$ engaging a ratchet wheel $v$, fixed on the shaft. Mounted loosely on the shaft is a second ratchet wheel $z$, which is continuously rotated by means of a gearing (not shown), connected to the driving axle of the car. Journaled on a pin fixed in the ratchet wheel $v$, is a double pawl $y$, adapted to engage the moving ratchet wheel $z$, on one side, and a stop 20 provided on the spring casing on the other side of the ratchet wheel $v$. The pawl $y$ is prevented from coming into contact with the ratchet wheel $z$ by a weak spring 19. When the spring casing has made one revolution the stop 20 on the spring casing engages the pawl $y$ and brings it into engagement with the ratchet wheel $z$. The ratchet wheel $v$ and the shaft $b$ are then rotated in the direction of the arrow in Fig. 2, and the spring thereby wound up. This movement continues till the pawl has so far outrun the stop 20 on the spring casing, that the stop again engages the pawl from behind and so disengages it from the ratchet wheel $z$.

We claim:

1. In a speed indicator, continuously adjusted speed measuring mechanism, a device to indicate steps or ranges of speed, normally locked means, including a spring, to actuate said device, means operated positively by said speed measuring mechanism, when certain speeds are attained, to release said actuating means, and means to rewind said spring automatically.

2. In a speed indicator having continuously adjusted speed measuring mechanism, the combination of a continuously adjusted indicating hand, a leaping hand for marking the speed in a definite number of steps, a driving gear for actuating said leaping hand, a spring for actuating said driving gear and acting independently of the continuously adjusted speed measuring mechanism, and means for winding up said spring.

3. In a speed indicator having continuously adjusted speed measuring mechanism, the combination of a leaping hand for marking the speed in a definite number of steps, a driving gear for actuating said leaping hand, a spring for actuating said driving gear and acting independently of the continuously adjusted speed measuring mechanism, and means for winding up said spring.

4. In a speed indicator having continuously adjusted speed measuring mechanism, the combination of a leaping hand for marking the speed in a definite number of steps, and means for actuating said hand, comprising a shaft carrying the same, two cogwheels loosely mounted on said shaft, means for rotating them in opposite directions, a spring to operate said last means and acting independently of the continuously adjusted speed measuring mechanism, toothed disks secured to the respective cogwheels, two disks fixed on said shaft and carrying pawls placed at equal distances oppositely from each other and adapted to engage normally one of the teeth of said disks, a cogwheel mounted loosely on said shaft between said fixed disks and driven from the continuously adjusted speed measuring mechanism, and cam disks on said cogwheel adapted to release one or the other of said pawls when the said cam disks are rotated by the continuously adjusted speed measuring mechanism.

5. In a speed indicator having continuously adjusted speed measuring mechanism, the combination of a continuously adjusted indicating hand, a leaping hand marking the speed in a definite number of steps and means for actuating said leaping hand, comprising a shaft carrying the same, two cogwheels loosely mounted on said shaft, means for rotating them in opposite directions, a spring to actuate said last means and operating independently of the continuously adjusted speed measuring mechanism, toothed disks secured to the respective cogwheels, two disks fixed on said shaft and carrying pawls placed at equal distances oppositely from each other, and adapted to normally engage one of the teeth of said disks, a cogwheel mounted loosely on said shaft between the fixed disks, and driven from the continuously adjusted speed measuring mechanism, and cam disks on said cogwheel adapted to release one or the other of said pawls when said cam disks are rotated by the continuously adjusted speed measuring mechanism.

6. In a speed indicator having continuously adjusted speed measuring mechanism, the combination of two oppositely directed dials, a leaping indicator hand to sweep each dial, a continuously adjusted indicator hand to sweep one dial, mechanism for actuating the leaping hands, a spring to drive said mechanism and acting independently of the continuously adjusted speed measuring mechanism and means releasable by the continuously adjusted speed measuring mechanism to normally lock said driving mechanism.

In testimony whereof we have affixed our signatures, in presence of two witnesses.

OTTO BOTHE.
OTTO LÖSCHER.

Witnesses:
HENRY HASPER,
WOLDEMAR HAUPT